United States Patent
Takahashi

(10) Patent No.: US 10,949,603 B2
(45) Date of Patent: Mar. 16, 2021

(54) INFORMATION PROCESSING APPARATUS, INFORMATION PROCESSING METHOD, AND RECORDING MEDIUM

(71) Applicant: CANON KABUSHIKI KAISHA, Tokyo (JP)

(72) Inventor: Kentaro Takahashi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/604,456

(22) Filed: May 24, 2017

(65) Prior Publication Data

US 2017/0344521 A1    Nov. 30, 2017

(30) Foreign Application Priority Data

May 31, 2016    (JP) .............................. JP2016-109337

(51) Int. Cl.
*G06F 40/109*    (2020.01)

(52) U.S. Cl.
CPC .................................. *G06F 40/109* (2020.01)

(58) Field of Classification Search
CPC .............................. G06F 17/214; G06F 40/109
See application file for complete search history.

(56) References Cited

U.S. PATENT DOCUMENTS

| | | | | |
|---|---|---|---|---|
| 5,751,289 A * | 5/1998 | Myers | ...................... | G06T 15/10 345/419 |
| 6,445,458 B1 * | 9/2002 | Focazio | ................ | G06F 40/129 358/1.11 |
| 7,219,309 B2 * | 5/2007 | Kaasila | ............... | G06F 16/9577 715/800 |
| 7,222,306 B2 * | 5/2007 | Kaasila | ................. | G06F 3/0481 715/801 |
| 7,640,498 B2 * | 12/2009 | Koechley | ............ | G06F 16/9577 715/255 |
| 8,860,957 B2 * | 10/2014 | Akuzawa | ............... | G06K 15/00 358/1.11 |
| 9,317,485 B2 * | 4/2016 | Dent | .................... | G06Q 10/107 |

(Continued)

FOREIGN PATENT DOCUMENTS

| | | |
|---|---|---|
| JP | H04-348388 A | 12/1992 |
| JP | 2002-007096 A | 1/2002 |

(Continued)

OTHER PUBLICATIONS

CSS-Tricks.com, May 2013, pp. 1-11 https://css-tricks.com/almanac/properties/f/font-size/.*

(Continued)

*Primary Examiner* — Scott T Baderman
*Assistant Examiner* — Mario M Velez-Lopez
(74) *Attorney, Agent, or Firm* — Canon U.S.A., Inc. IP Division

(57) ABSTRACT

An apparatus for executing an application on a virtual machine, directed to setting a font size of a font in detail, includes an acquisition unit configured to acquire a font size specified by the application operating on the virtual machine and font setting data including a font size conversion rule, and a control unit configured to control a display apparatus to display a font with a font size based on the specified font size and the font setting data.

20 Claims, 19 Drawing Sheets

(56) References Cited

U.S. PATENT DOCUMENTS

| | | | |
|---|---|---|---|
| 2003/0014545 A1* | 1/2003 | Broussard | H04L 29/06 709/250 |
| 2004/0221234 A1* | 11/2004 | Imai | H04L 63/0428 715/256 |
| 2007/0172199 A1* | 7/2007 | Kobayashi | G11B 27/034 386/241 |
| 2010/0145676 A1* | 6/2010 | Rogers | G06F 40/157 704/9 |
| 2010/0199168 A1* | 8/2010 | Balinsky | G06F 40/103 715/234 |
| 2012/0266165 A1* | 10/2012 | Cen | G06F 9/45541 718/1 |
| 2013/0007598 A1* | 1/2013 | Draper | G06F 17/227 715/235 |
| 2013/0007602 A1* | 1/2013 | Dougherty | G06T 11/60 715/251 |
| 2013/0326348 A1* | 12/2013 | Ip | G06F 17/214 715/269 |
| 2014/0257789 A1 | 9/2014 | Zaric | |
| 2015/0117768 A1* | 4/2015 | Chang | G06T 11/203 382/162 |
| 2015/0347356 A1* | 12/2015 | Beaver | G06F 40/109 345/472 |
| 2017/0344520 A1* | 11/2017 | Takahashi | G06F 16/9577 |
| 2017/0351537 A1* | 12/2017 | AbiEzzi | G06F 3/14 |

FOREIGN PATENT DOCUMENTS

| | | |
|---|---|---|
| JP | 2003-308204 A | 10/2003 |
| JP | 2004-023492 A | 1/2004 |
| JP | 2004-157502 A | 6/2004 |
| JP | 2005-111718 A | 4/2005 |
| JP | 2005-172346 A | 6/2005 |
| JP | 2005-196397 A | 7/2005 |
| JP | 2007-79830 A | 3/2007 |
| JP | 2008-015354 A | 1/2008 |
| JP | 2010-191704 A | 9/2010 |
| JP | 2011-002536 A | 1/2011 |
| JP | 2011-099977 A | 5/2011 |
| JP | 2014-149858 A | 8/2014 |
| JP | 2016-071668 A | 5/2016 |

OTHER PUBLICATIONS

W3.org CSS Fonts, Apr. 28, 2016, pp. 1-12 https://web.archive.org/web/20160428122324/https://www.w3.org/TR/CSS2/fonts.html.*

Font, W3.org, Apr. 6, 2016, pp. 1-34 https://web.archive.org/web/20160406202054/https://www.w3.org/TR/1998/PR-CSS2-19980324/fonts.html.*

* cited by examiner

FIG. 10

| FONT SIZE (fs) SPECIFIED BY APPLICATION | fs<=14 | fs<18 | 18<=fs | fs<22 | fs<24 | 24<=fs |
|---|---|---|---|---|---|---|
| CONVERTED FONT SIZE (SVGA MODEL) | 12pt | 16pt | 18pt | | | 24pt |
| CONVERTED FONT SIZE (VGA MODEL) | | | 18pt | | 22pt | |

FIG. 11

```
s<=14 -> 12pt
14<s<18 -> 16pt
18<=s<24 -> 18pt
24<=s -> 24pt
```
FONT SETTING EXTENSION FILE
FOR SVGA MODEL 306

```
s<=14 -> 12pt
14<s<18 -> 16pt
18<=s<22 -> 18pt
22<=s -> 22pt
```
FONT SETTING EXTENSION FILE
FOR VGA MODEL 306

FIG. 12

```
[family=DIALOG]
s<=14 -> 12pt
14<s<18 -> 16pt
18<=s<24 -> 18pt
24<=s -> 24pt

[family=MONOSPACED]
s<=14 -> 12pt
14<s<18 -> 16pt
18<=s<24 -> 18pt
24<=s -> 24pt
```

FONT SETTING EXTENSION FILE 306

FIG. 13

```
[lang=En]
s<=14 -> 12pt
14<s<18 -> 16pt
18<=s<24 -> 18pt
24<=s -> 24pt

[lang=JP]
s<=14 -> 12pt
14<s<18 -> 16pt
18<=s<24 -> 18pt
24<=s -> 24pt
```

FONT SETTING EXTENSION FILE 306

FIG. 14

```
[Style=Plain]
s<=14 -> 12pt Bold
14<s<18 -> 16pt Plain
18<=s<24 -> 18pt Plain
24<=s -> 24pt Plain

[Style=*]
s<=14 -> 12pt
14<s<18 -> 16pt
18<=s<24 -> 18pt
24<=s -> 24pt
```

FONT SETTING EXTENSION FILE 306

FONT SETTING EXTENSION FILE 306

FONT SETTING EXTENSION FILE 306

INFORMATION PROCESSING APPARATUS, INFORMATION PROCESSING METHOD, AND RECORDING MEDIUM

BACKGROUND OF THE INVENTION

Field of the Invention

The aspect of the embodiments relates to an information processing apparatus for executing an application on a virtual machine, an information processing method, and a recording medium.

Description of the Related Art

Conventionally, a virtual machine technique for executing a computer program performing screen display is known. In this technique, characters of a font specified by the program are displayed on a display screen. However, the font which should be displayed may depend on the execution environment of the virtual machine. Therefore, the virtual machine is provided with a function of setting the font to be displayed.

To set the font to be displayed, a standard setting file for the virtual machine is generally used. However, using only the standard setting file for the virtual machine is not sufficient in some cases.

Methods for changing front settings are discussed in Japanese Patent Application Laid-Open No. 2003-308204, Japanese Patent Application Laid-Open No. 2007-79830, and Japanese Patent Application Laid-Open No. 2010-191704.

Japanese Patent Application Laid-Open No. 2003-308204 discusses a technique for changing a drawing command to be executed by a program based on an attribute file included in the program. When changing the drawing command, an apparatus according to the technique refers to screen size information included in the attribute file and enlarges the font size according to the referenced screen size information. The enlarged display makes the font more legible even in a small screen. However, since there is only one font size after enlargement, the appearance will become monotonous.

Japanese Patent Application Laid-Open No. 2007-79830 discusses a technique for storing user identification information and user interface (UI) setting information, and changing the size and color of a font of document data to a style indicated by the UI setting information before output. However, the font size cannot be set in detail by the technique.

Japanese Patent Application Laid-Open No. 2010-191704 discusses a technique for drawing, if a program specifies a font size smaller than the minimum font size in a screen, a font after the font size is converted to the minimum size offered by a device. However, since there is only one font size after font conversion, the intention of the program cannot be easily reflected on the screen layout.

SUMMARY OF THE INVENTION

According to an aspect of the embodiments, an apparatus for executing an application on a virtual machine includes an acquisition unit configured to acquire a font size specified by the application operating on the virtual machine and font setting data including a font size conversion rule, and a control unit configured to control a display apparatus to display a font with a font size based on the specified font size and the font setting data.

Further features of the disclosure will become apparent from the following description of exemplary embodiments with reference to the attached drawings.

BRIEF DESCRIPTION OF THE DRAWINGS

FIG. 10 illustrates a font size conversion table according to the first exemplary embodiment.

FIG. 11 illustrates examples of descriptions in font setting extension files according to the first exemplary embodiment.

FIG. 12 illustrates an example of a description in the font setting extension file according to the second exemplary embodiment.

FIG. 13 illustrates an example of a description in the font setting extension file according to the third exemplary embodiment.

FIG. 14 illustrates an example of a description in the font setting extension file according to the fourth exemplary embodiment.

DESCRIPTION OF THE EMBODIMENTS

Exemplary embodiments of the disclosure will be described in detail below with reference to the accompanying drawings.

Figure 1:
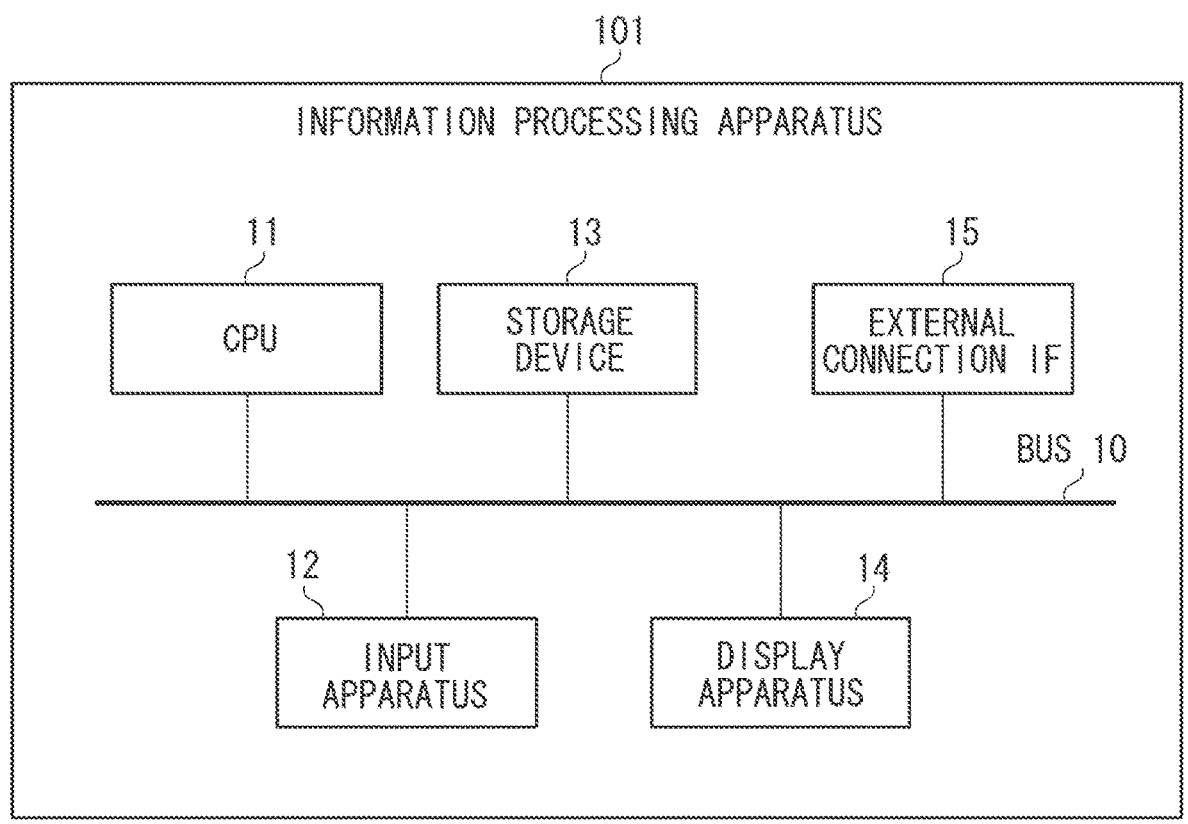
FIG. 1 is a schematic view illustrating an example of a hardware configuration of an information processing apparatus.

A first exemplary embodiment will be described below. FIG. 1 illustrates an example of a hardware configuration of a standard information processing apparatus 101. As illustrated in FIG. 1, the information processing apparatus 101 includes a central processing unit (CPU) 11 as a hardware configuration.

When the CPU 11 executes processing based on an application (described below) stored in a storage device 13 and a program applicable to each program execution environment to implement each function or flowchart (described below).

An input apparatus 12, the storage device 13, a display apparatus 14, and an external connection interface (IF) 15 are connected to the CPU 11 via a bus 10. The input apparatus 12 is a keyboard and/or a mouse for inputting information. The storage device 13 including a read only memory (ROM), a random access memory (RAM), and a hard disk drive stores not only the above-described programs but also data to be used in processing based on the programs. The display apparatus 14 is a display for displaying a screen. The external connection IF 15 is a network interface and various types of interfaces for connection with an external apparatus.

The CPU 11 can function as various units by executing a program. A control circuit such as an application specific integrated circuit (ASIC) operating in cooperation with the CPU 11 may function as these units. These units may also be implemented through the cooperation between the CPU 11 and a control circuit for controlling operations of the information processing apparatus 101. The CPU 11 may be one or a plurality of CPUs. A plurality of CPUs 11 can perform processing in a distributed way. A plurality of CPUs 11 may be installed in a single computer or in physically different computers. A unit implemented when the CPU 11 executes the program may also be implemented by a dedicated circuit.

Figure 2:
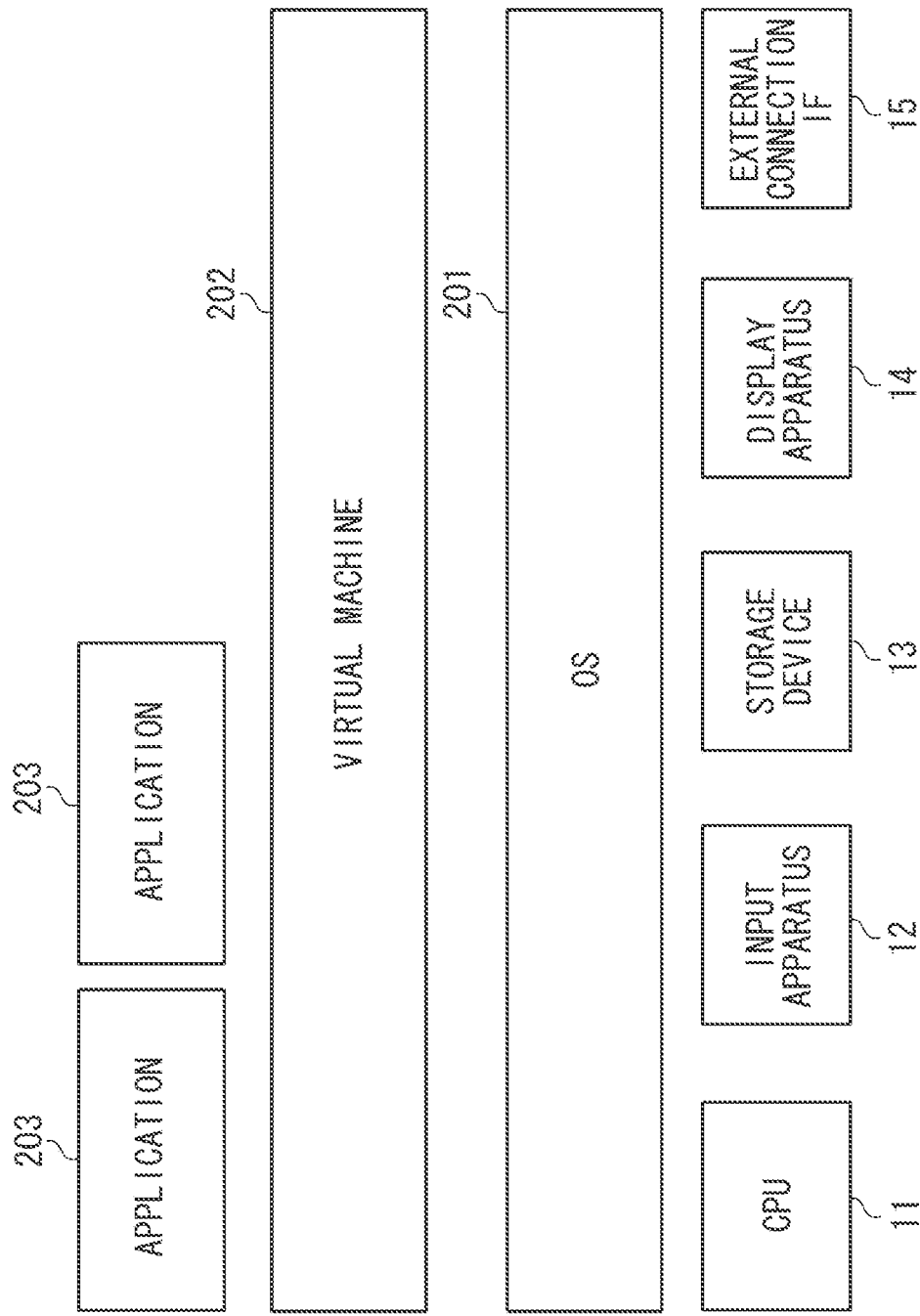
FIG. 2 is a schematic view illustrating an example of a system configuration built on the information processing apparatus.

A configuration of a system structured in the information processing apparatus 101 will be described below with reference to FIG. 2. FIG. 2 illustrates an example of a system configuration of the information processing apparatus 101.

An operating system 201 serves as the basis of the entire system. A virtual machine 202 is a process on the operating system 201 and is software for offering an environment where applications 203 operate. Applications 203 are programs executed and operated on the virtual machine 202.

Figure 3:
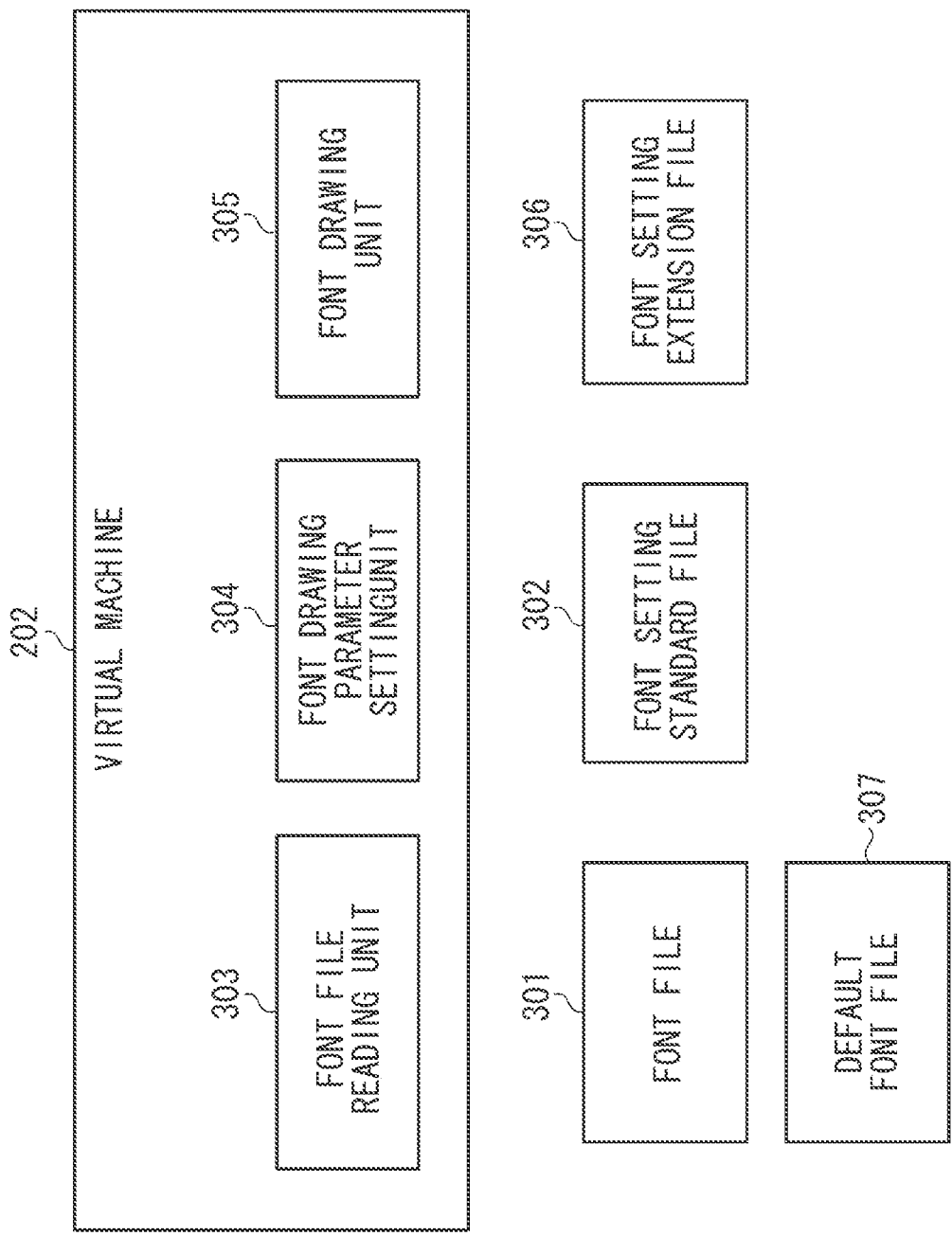
FIG. 3 is a schematic view illustrating a configuration of a virtual machine.

A specific configuration of the virtual machine 202 will be described below with reference to FIG. 3. FIG. 3 illustrates functions included in the virtual machine 202 and related files. The virtual machine 202 includes a font file reading unit 303 for reading a font in a font file 301 included in the information processing apparatus 101. The font file 301 includes font data for representing the character shapes. The font file 301 exists as a plurality of files for each individual logical fonts and font styles of fonts (described below).

The virtual machine 202 includes a font drawing parameter setting unit 304 for receiving a parameter specification for the font specified when an application 203 draws characters. The font drawing parameter setting unit 304 has a function of reading a font setting extension file 306 included in the information processing apparatus 101 and reading a conversion rule for converting parameters for font drawing.

Further, the virtual machine 202 includes a font drawing unit 305 for drawing the font read by the font file reading unit 303 on a screen.

More specifically, the virtual machine 202 according to the present exemplary embodiment is Java Runtime Environment (JRE). JRE is a software set to execute software developed in the Java (registered trademark) language. JRE includes class libraries and JavaVM (software for executing applications described in the Java language). JRE is disposed together with a default font file 307 for JavaVM in the information processing apparatus 101. Hereinafter, the information processing apparatus 101 is referred to as an apparatus.

The virtual machine 202 surely includes five different logical fonts (serif, sansserif, monospaced, dialog, and dialoginput). Four different standard styles (plain, bold, italic, and bolditalic) can be applied to each logical font. Other logical fonts can be added depending on the execution environment of the apparatus.

A font setting standard file 302 describes settings of the association between the font file 301 included in the apparatus, each logical font, and each style. At the time of activation, the virtual machine 202 reads the font setting standard file 302 and sets a font. The font setting standard file 302 is arranged together with JRE of the virtual machine 202 like the default font file 307. The font setting standard file 302 refers to a font configuration file included in JavaVM as standard.

The formats of the font file 301 which can be read by the virtual machine 202 include TrueType, PostScript, and OpenType. These formats are composed of scalable fonts which can be freely enlarged. Bitmap fonts for expressing a character in units of dots can be embedded in fonts of such formats. Although bitmap fonts cannot be enlarged or reduced, they have artificially arranged character shapes and are more legible than scalable fonts.

However, in the font setting standard file 302 included in the virtual machine 202, it is not possible to specify a setting in consideration of the included bitmap font in handling a font file with embedded bitmap fonts.

For example, assume a case where the apparatus has the font file 301 with embedded 10 and 15 point (pt.) bitmap fonts, and the application 203 is a program for drawing a title and body text with the 12 and 16 pt. font sizes. In this case, since there is no bitmap font corresponding to 12 and 16 pt., the title and body text are drawn with scalable fonts enlarged or reduced to 12 and 16 pt. However, if the 10 and 15 pt. bitmap fonts included in the apparatus are used, a font can be drawn in a more legible way although the font sizes of the title and body text are changed.

In addition, a plurality of applications 203 operates on the apparatus. Therefore, if the applications 203 draw fonts of different sizes, a user may sense that screen interfaces lack a feeling of unity. If the sizes of fonts to be drawn by the applications 203 are unified to the bitmap fonts included in the apparatus, screen interfaces can be realized which gives a feeling of unity.

Therefore, a mechanism is provided for converting the size of a font to be drawn by each application 203 depending on the bitmap fonts included in the apparatus.

Figure 4:
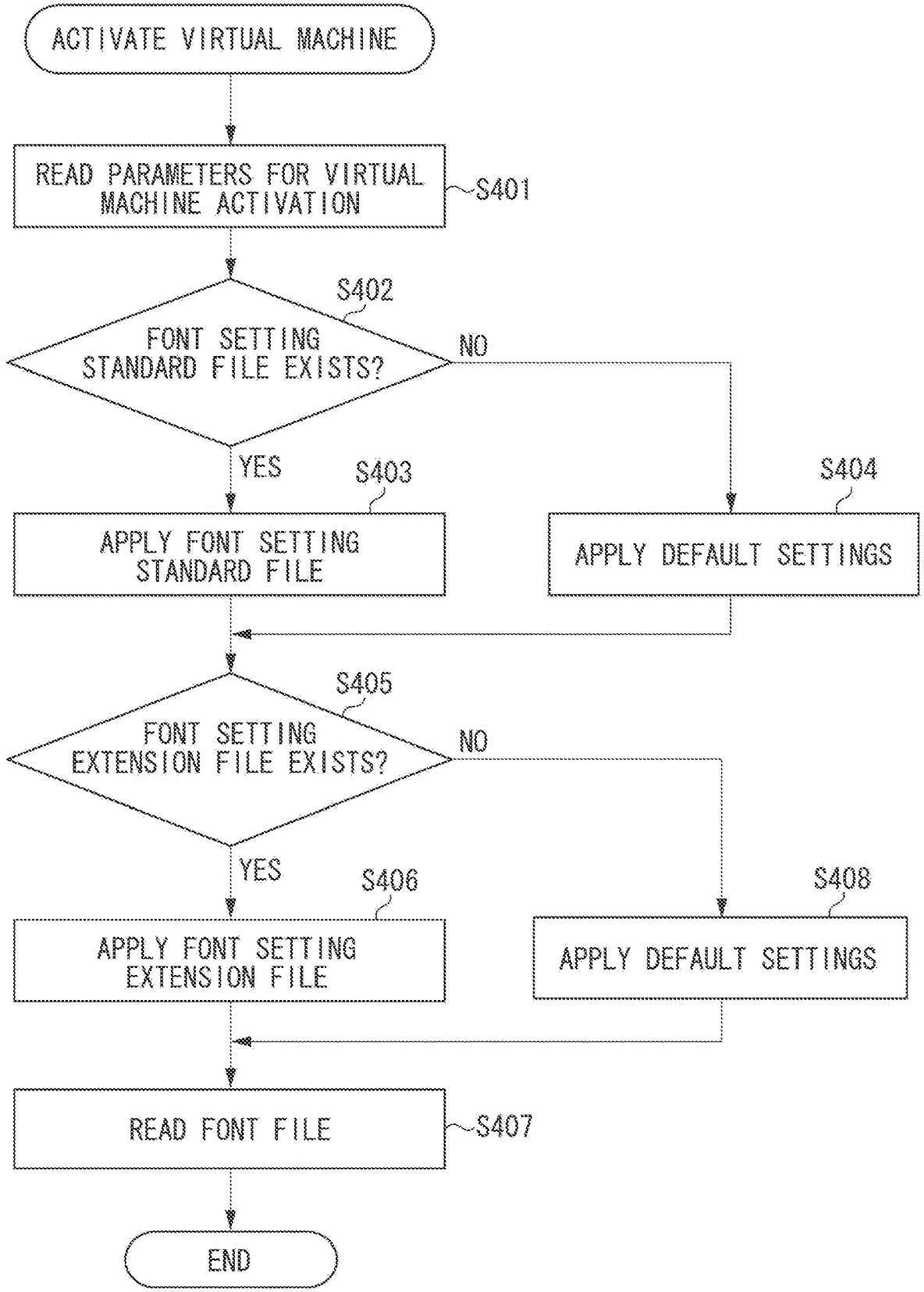
FIG. 4 is a flowchart illustrating processing for activating the virtual machine according to a first exemplary embodiment.

A procedure for implementing this mechanism will be described below with reference to FIG. 4. FIG. 4 is a flowchart illustrating processing for activating the virtual machine 202.

The following describes a method for selecting the size of the font to be drawn by the application 203 by using the font setting extension file 306 which describes settings for selecting the sizes of fonts corresponding to the bitmap fonts included in the apparatus.

There are two different apparatus models with the SVGA (600×800 dots) and VGA (480×640 dots) screen sizes. FIG. 10 is a table illustrating a rule for converting the size of the drawing target font to the size of a bitmap font included in each model. As illustrated in FIG. 10, the SVGA model is provided with the 12, 16, 18, and 24 pt. bitmap fonts, and the VGA model is provided with the 12, 16, 18, and 22 pt. bitmap fonts.

FIG. 11 illustrates examples of descriptions in the font setting extension file 306. Referring to the descriptions in FIG. 11, "s" denotes the font size for drawing specified by the application 203, and each line describes a condition that the value "s" satisfies and a conversion target size based on the condition. The description format is not limited to a particular format as long as it can express a rule for converting the font size to the bitmap font sizes illustrated in FIG. 10. By preparing the font setting extension file 306 for each model and using the virtual machine 202 common to both models, the development efficiency can be improved.

When the activation of the apparatus is started, the operating system 201 starts. Then, the activation of the virtual machine 202 for executing the application 203 is started. In step S401, when the activation of the virtual machine 202 is started, the virtual machine 202 receives parameters as arguments and reads the parameters. The parameters include the path of the font setting standard file 302 and the path of the font setting extension file 306.

In step S402, the virtual machine 202 confirms whether the font setting standard file 302 of the received path exists, using the font drawing parameter setting unit 304. When the font setting standard file 302 exists (YES in step S402), the processing proceeds to step S403. In step S403, the virtual machine 202 reads the font setting standard file 302 and applies the setting data.

On the other hand, when the font setting standard file 302 does not exist (NO in step S402), the processing proceeds to step S404. In step S404, the virtual machine 202 applies default settings. The default settings are settings for displaying the default font file 307. Even if the font setting standard file 302 is damaged or a wrong parameter is given as an argument at the time of activation, the default settings enable drawing of characters on the screen and prevent the apparatus from becoming non-operational for the user.

In step S405, the virtual machine 202 confirms whether the font setting extension file 306 exists using the font drawing parameter setting unit 304. When the font setting extension file 306 exists (YES in step S405), the processing proceeds to step S406. In step S406, the virtual machine 202 reads the font setting extension file 306 and applies the setting data.

On the other hand, when the font setting extension file 306 does not exist (NO in step S405), the processing proceeds to step S408. In step S408, the virtual machine 202 applies default settings. Simplest examples of default settings are settings for not performing the font size conversion. Certain setting values may be defined as the default settings.

In step S407, the virtual machine 202 reads the font file 301 using the font file reading unit 303.

This completes the description of the processing in which the virtual machine 202 reads the font setting extension file 306 during activation.

Processing in which the virtual machine 202 draws a font upon reception of a character drawing command from the application 203 will be described below.

In order for the virtual machine 202 to draw characters on the screen, the virtual machine 202 reads the font file 301 using the font file reading unit 303 as described in step S407. When the application 203 issues a character drawing command, the font drawing unit 305 draws characters on the screen by using the fonts included in the font file 301.

In order for the application 203 to draw characters, the application 203 itself generates an instance of a font object (hereinafter referred to as a font instance). When generating a font instance, the virtual machine 202 specifies a font family, font size, and font style using the font drawing parameter setting unit 304. The name of a logical font is specified as the font family. When a character string drawing Application Programming Interface (API) offered by the virtual machine 202 is executed using this font instance as an argument, characters are drawn.

The application 203 cannot grasp the sizes of the bitmap fonts included in the apparatus. Even if the application 203 can grasp the sizes of the bitmap fonts included in the apparatus, when the bitmap font sizes are individually installed on each application 203, the development efficiency is decreased. Accordingly, the virtual machine 202 suitably converts the font size specified in the font instance by the application 203 such that the font to be drawn by the application 203 becomes applicable to the execution environment.

Figure 5:
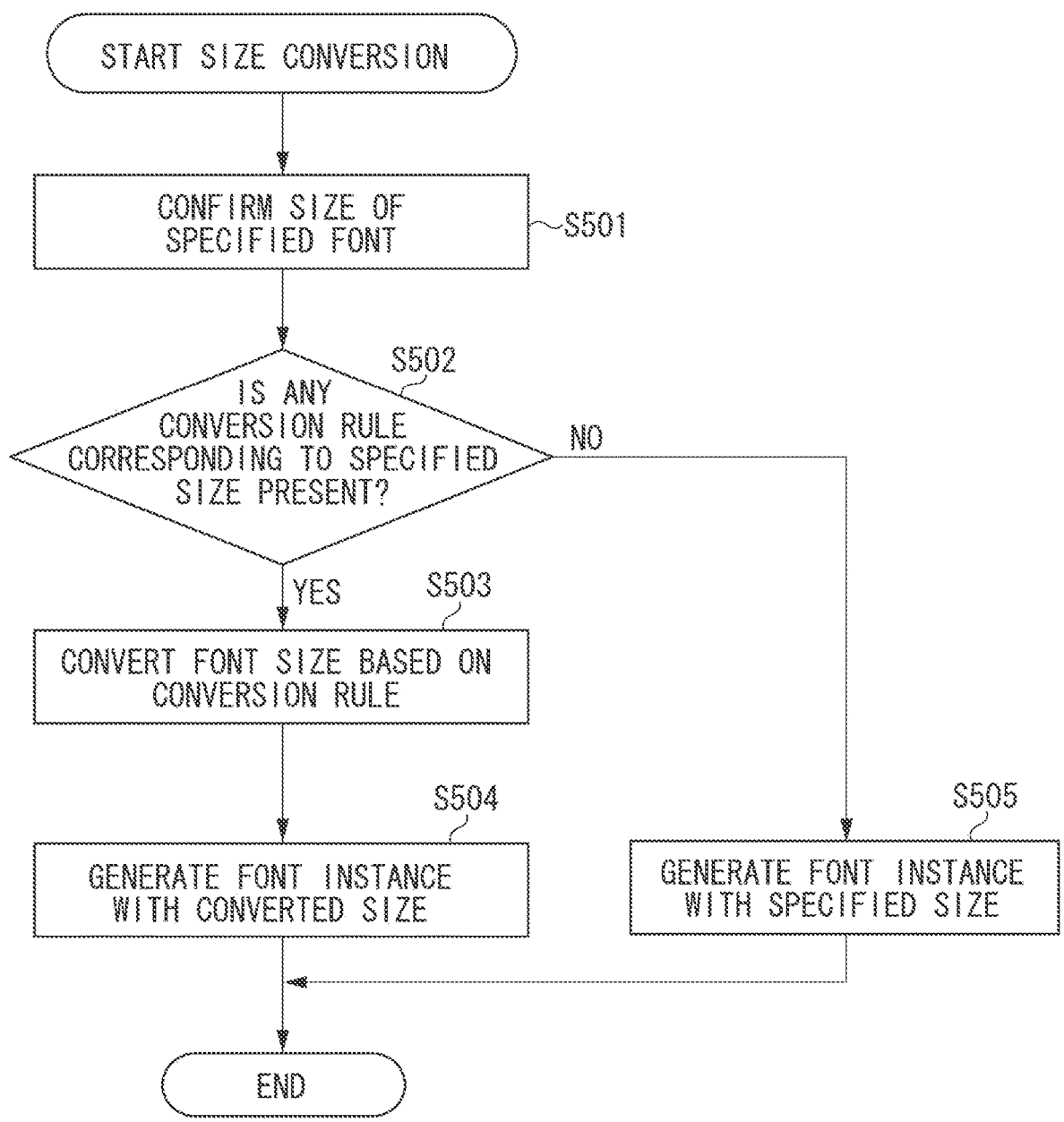
FIG. 5 is a flowchart illustrating processing for generating a font instance according to the first exemplary embodiment.

Processing in which the virtual machine 202 converts the font size will be described below with reference to FIG. 5. FIG. 5 is a flowchart illustrating processing for generating a font instance.

When the application 203 gives parameters of the font to be generated to an API offered by the virtual machine 202, the generation of a font instance is started. The virtual machine 202 gives the received parameters to the font drawing parameter setting unit 304. In step S501, the font drawing parameter setting unit 304 confirms the size of the specified font.

In step S502, the font drawing parameter setting unit 304 confirms whether a conversion rule corresponding to the specified size is included in the conversion rule applied in step S406 or S408.

When such a corresponding conversion rule is present (YES in step S502), the processing proceeds to step S503. In step S503, the font drawing parameter setting unit 304 converts the specified size based on the conversion rule. In step S504, the font drawing parameter setting unit 304 generates a font instance of the converted size.

On the other hand, when such a corresponding conversion rule is not present (NO in step S502), the processing proceeds to step S505. In step S505, the font drawing parameter setting unit 304 generates a font instance with the specified size.

When the processing of step S504 or S505 is completed, the processing for generating a font instance ends.

The above is the method for converting the size of the font to be drawn by the application 203 according to the bitmap fonts included in the apparatus.

A second exemplary embodiment will be described below. The first exemplary embodiment has been described above with respect to a method for converting the font size. However, the method for converting the font size may differ for each font family. For example, when bitmap fonts are embedded only in fonts of a specific family, there is not much necessity to convert the size of a font incorporating no bitmap font.

Figure 6:
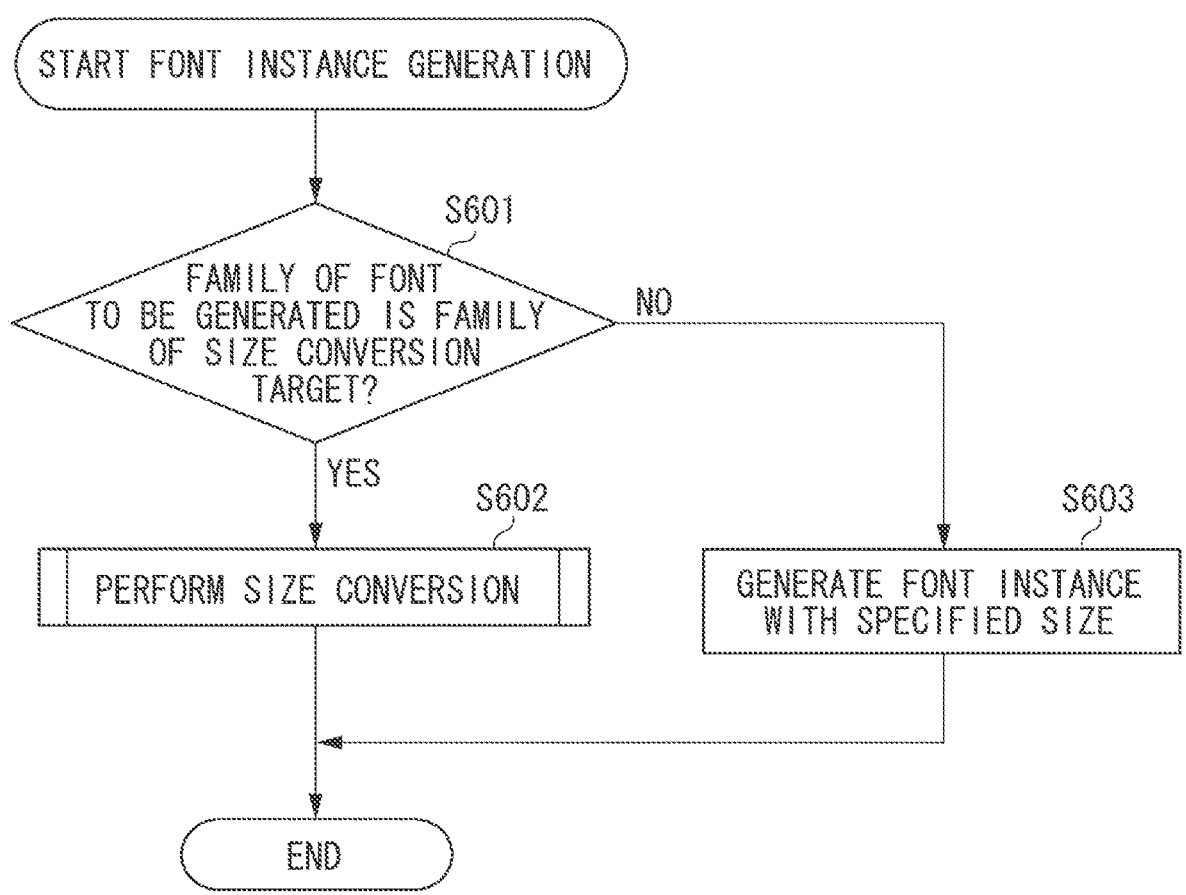
FIG. 6 is a flowchart illustrating processing for generating a font instance according to a second exemplary embodiment.

The second exemplary embodiment will be described below with respect to a method for converting the font size with reference to a family. Descriptions will be made with reference to FIGS. 6 and 12. FIG. 6 is a flowchart illustrating processing for generating a font instance. FIG. 12 illustrates an example of a description in the font setting extension file 306. The example illustrated in FIG. 12 indicates a rule of converting the size in a case of family fonts DIALOG and MONOSPACED.

The font drawing parameter setting unit 304 receives a family, size, and style and starts processing for generating a font instance. In step S601, the font drawing parameter setting unit 304 confirms whether the family of the font to be generated is the family of the size conversion target.

When the family of the font to be generated is the family of the size conversion target (YES in step S601), the processing proceeds to step S602. In step S602, the font drawing parameter setting unit 304 performs the size conversion illustrated in FIG. 5. On the other hand, when the family of the font to be generated is not the family of the size conversion target (NO in step S601), the processing proceeds to step S603. In step S603, the font drawing parameter setting unit 304 generates a font instance with the specified size without performing the size conversion.

When the processing in step S602 or S603 is completed, the processing for generating a font instance ends.

The above is the description of the method for converting the font size with reference to the family.

A third exemplary embodiment will be described below. Fonts are affected not only by the family but also by the display language. For example, when the display language is Japanese, the font file 301 for Japanese is used. When the display language is English, the font file 301 for English is used. Suitable font sizes may differ between Japanese and English because Japanese characters have more complicated shapes than English characters.

Figure 7:
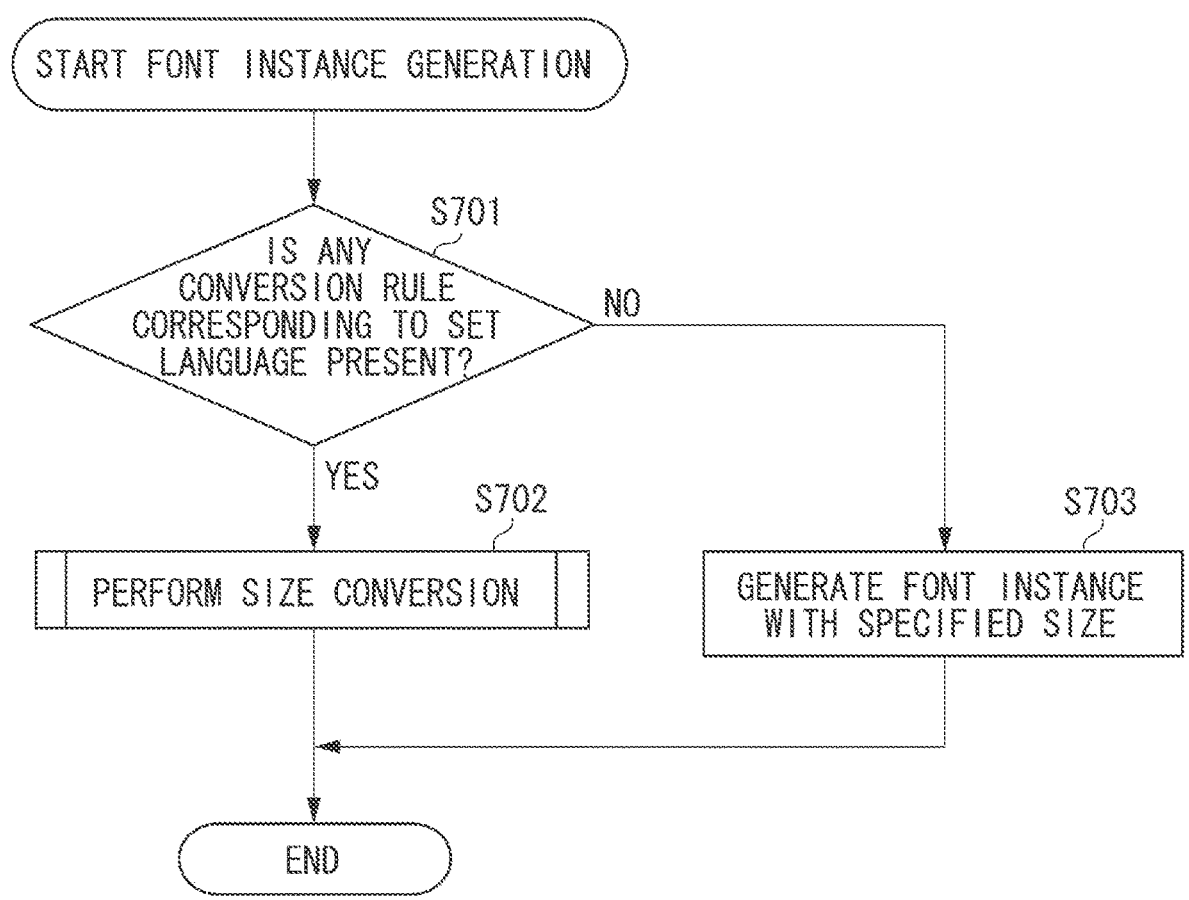
FIG. 7 is a flowchart illustrating processing for generating a font instance according to a third exemplary embodiment.

A third exemplary embodiment will be described below with respect to a method for converting the font size according to the display language. Descriptions will be made with reference to FIGS. 7 and 13. FIG. 7 is a flowchart illustrating processing for generating a font instance. FIG. 13 illustrates an example of a description in the font setting extension file 306. The example illustrated in FIG. 13 indicates rules of size conversion when the language is English (En) and Japanese (JP).

The font drawing parameter setting unit 304 receives a family, size, and style and starts processing for generating a font instance. In step S701, the font drawing parameter setting unit 304 confirms whether any conversion rule corresponding to the language set to be displayed on the apparatus is present. To acquire the language set to be displayed on the apparatus, an API offered by the virtual machine 202 is used.

When such a conversion rule is present (YES in step S701), the processing proceeds to step S702. In step S702, the font drawing parameter setting unit 304 performs the size conversion illustrated in FIG. 5. On the other hand, when such a conversion rule is not present (NO in step S701), the processing proceeds to step S703. In step S703, the font drawing parameter setting unit 304 generates a font instance with the specified size without performing the size conversion.

When the processing in step S702 or S703 is completed, the processing for generating a font instance ends.

The above is the method for converting the font size with reference to the display language setting.

A fourth exemplary embodiment will be described below. The situation of illegibility of a font depends not only on the size but also on the style of the font. In the case of the standard style, small-sized fonts are drawn with thin lines and therefore become illegible. To address this situation, the style of a font to bold (BOLD) is converted instead of standard (PLAIN) only for small-sized fonts.

Figure 8:
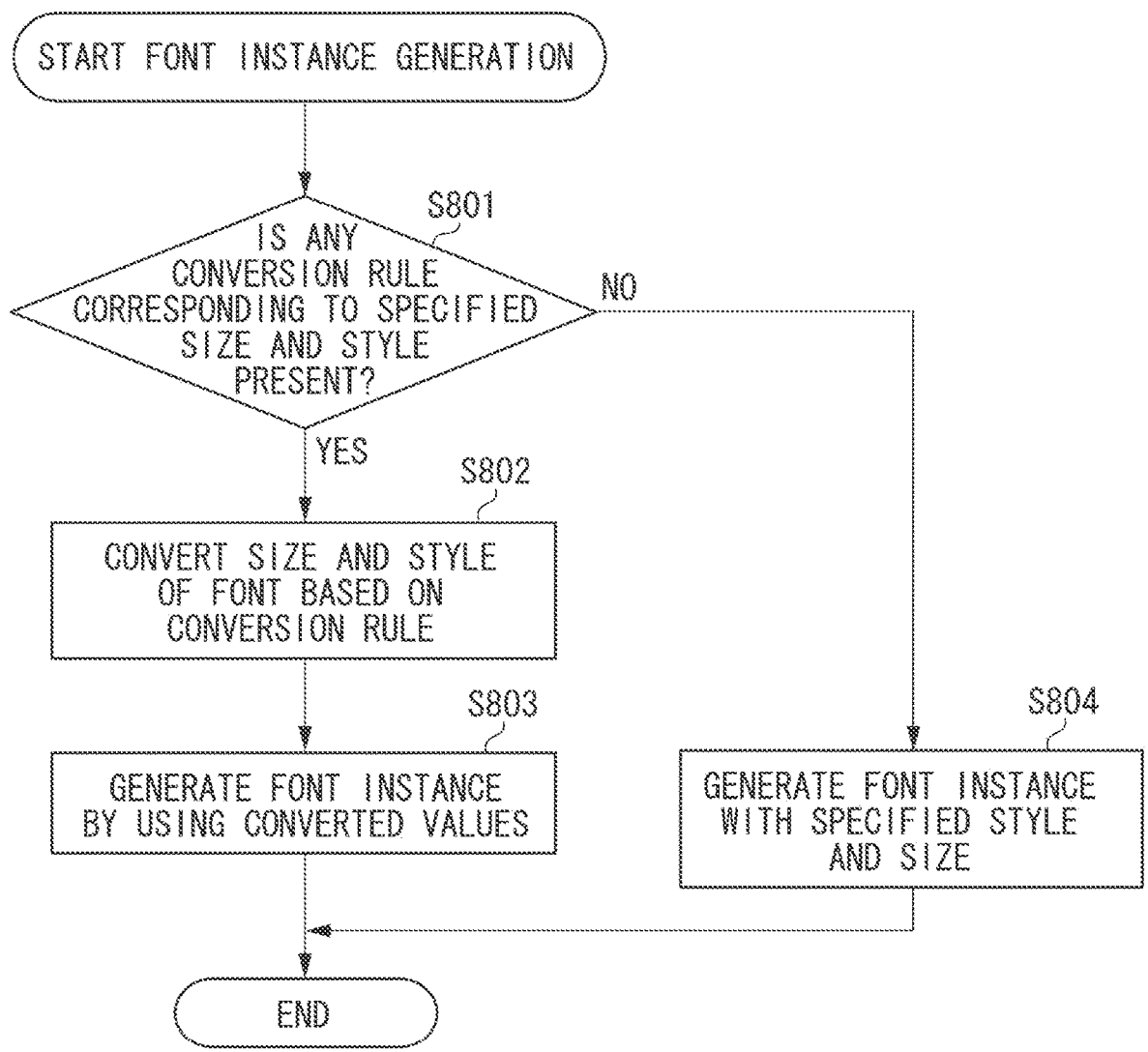
FIG. 8 is a flowchart illustrating processing for generating a font instance according to a fourth exemplary embodiment.

The fourth exemplary embodiment will be described below with respect to a method for converting the style of a font. Descriptions will be made with reference to FIGS. 8 and 14. FIG. 8 is a flowchart illustrating processing for generating a font instance. FIG. 14 illustrates an example of a description in the font setting extension file 306.

In the example illustrated in FIG. 14, rules are scanned from the top to downward and the rule which matches first is applied. If the style is Plain and size is 14 pt. or smaller which is specified when generating a font instance, a rule of converting the size and style to 12 pt. and Bold, matches. When the specified style is other than Plain, a block starting with "Style=*" matches and only the size conversion is performed.

The font drawing parameter setting unit 304 receives a family, size, and style and starts processing for generating a font instance. In step S801, the font drawing parameter setting unit 304 confirms whether a conversion rule corresponding to the specified size and style is present.

When such a conversion rule is present (YES in step S801), the processing proceeds to step S802. In step S802, the font drawing parameter setting unit 304 converts the style and size based on the conversion rule. In step S803, the font drawing parameter setting unit 304 generates a font instance by using the values of the converted style and size.

On the other hand, when such a conversion rule is not present (NO in step S801), the processing proceeds to step S804. In step S804, the font drawing parameter setting unit 304 generates a font instance by using the specified style and size without performing the style and size conversion.

When the processing in step S803 or S804 is completed, the processing for generating a font instance ends.

The above is the method for converting the style and size of a font.

A fifth exemplary embodiment will be described below. In the description of the first exemplary embodiment, the font drawing unit 305 draws characters on the screen by using the fonts included in the font file 301. Since the font file 301 is generally different for each language and style, a plurality of font files 301 exists in the apparatus.

The font drawing unit 305 selects the font file 301 to be used based on the font setting standard file 302. In specifying the font setting standard file 302, a plurality of font files 301 can be associated with one condition. When drawing a character, the font drawing unit 305 sequentially searches for the character in the associated font files 301 and, if it is found, draws the font.

When the font file 301 includes only a scalable font, there are two different search results: "a scalable font found" and "a scalable font not found". However, in the case of a font with an embedded bitmap font, there are three different search results: "a bitmap font found" in addition to the above-described two search results.

Figure 9:
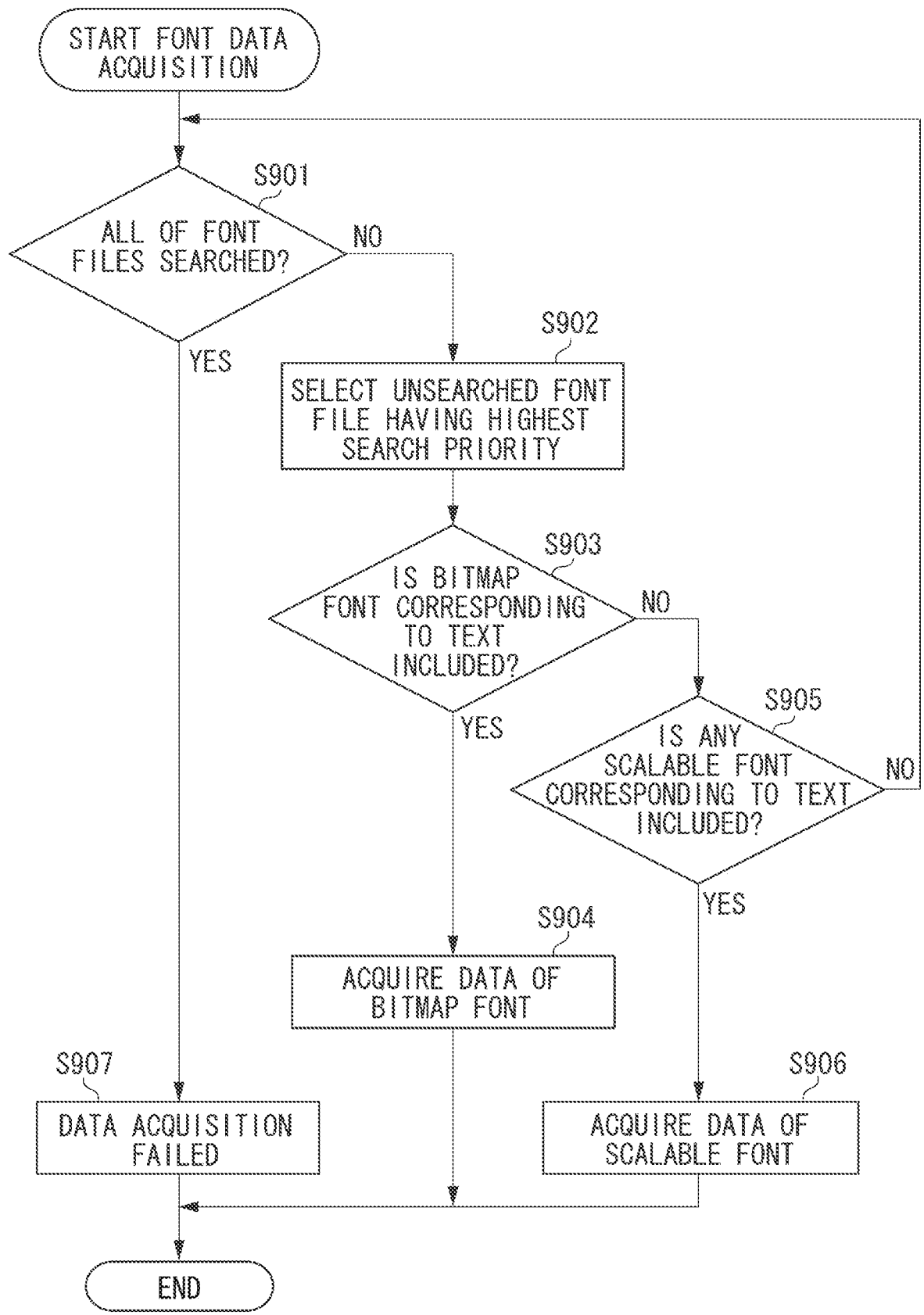
FIG. 9 is a flowchart illustrating processing for acquiring font data according to a five exemplary embodiment.

Processing in which the font drawing unit 305 handles the font file 301 with embedded bitmap fonts will be described below with reference to FIG. 9. FIG. 9 is a flowchart illustrating processing in which the font drawing unit 305 acquires font data.

In step S901, the font drawing unit 305 confirms whether search has been performed in all of the font files 301 associated by the font setting standard file 302. When search has been performed not in all of a plurality of the font files 301 (NO in step S901), the processing proceeds to step S902. In step S902, the font drawing unit 305 selects the font file 301 having the highest search priority as to which search has not yet been performed. The search priority is the order of descriptions of the font files 301 in the font setting standard file 302.

In step S903, the font drawing unit 305 confirms whether a bitmap font corresponding to the search target character is included in the selected font file 301. The font drawing unit 305 performs this confirmation using a standard index included in the format of the font file 301.

When a bitmap font corresponding to the search target character is included in the font file 301 (YES in step S903), the processing proceeds to step S904. In step S904, the font drawing unit 305 acquires the font data. Then, the processing for acquiring the font data ends.

On the other hand, when such a bitmap font is not included in the font file 301 (NO in step S903), the processing proceeds to step S905. In step S905, the font drawing unit 305 confirms whether a scalable font corresponding to the search target character is included in the font file 301.

If a scalable font corresponding to the search target character is included in the font file 301 (YES in step S905), the processing proceeds to step S906. In step S906, the font drawing unit 305 acquires the font data. Then, the processing for acquiring the font data ends.

On the other hand, when such a scalable font is not included in the font file 301 (NO in step S905), the processing returns to step S901. Then, the font drawing unit 305 executes step S901 again. If search has been performed in all of the font files 301 (YES in step S901), the processing proceeds to step S907. In step S907, the font drawing unit 305 recognizes that the acquisition of font data has failed. Then, the processing for acquiring the font data ends. When the acquisition of font data fails, a special symbol may be acquired so that garble is recognized in a case where a font file 301 defines a character for failure.

The above is the description of the processing in which the font drawing unit 305 handles the font file 301 with embedded bitmap fonts. By giving priority to a bitmap font when searching for font data in the font files 301, the apparatus can display a bitmap font with priority.

A sixth exemplary embodiment will be described below. In the description of the first exemplary embodiment, the size of the font to be drawn by the application 203 is converted according to the bitmap fonts included in the apparatus. However, only changing the drawing target character to a specified font size is not sufficient. The font metrics is converted, i.e., information about margins above and below characters and drawing position, to values suitable for the specified size.

Figure 15:
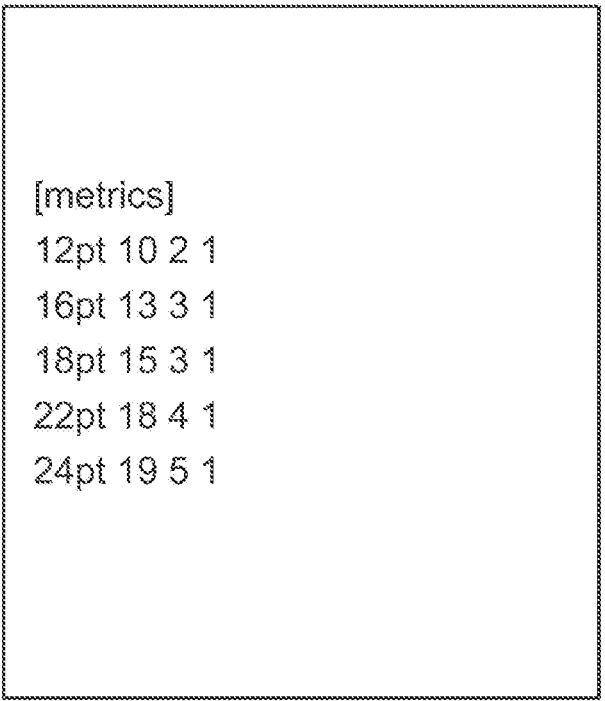
FIG. 15 illustrates an example of a description in the font setting extension file according to a sixth exemplary embodiment.
Figure 16:
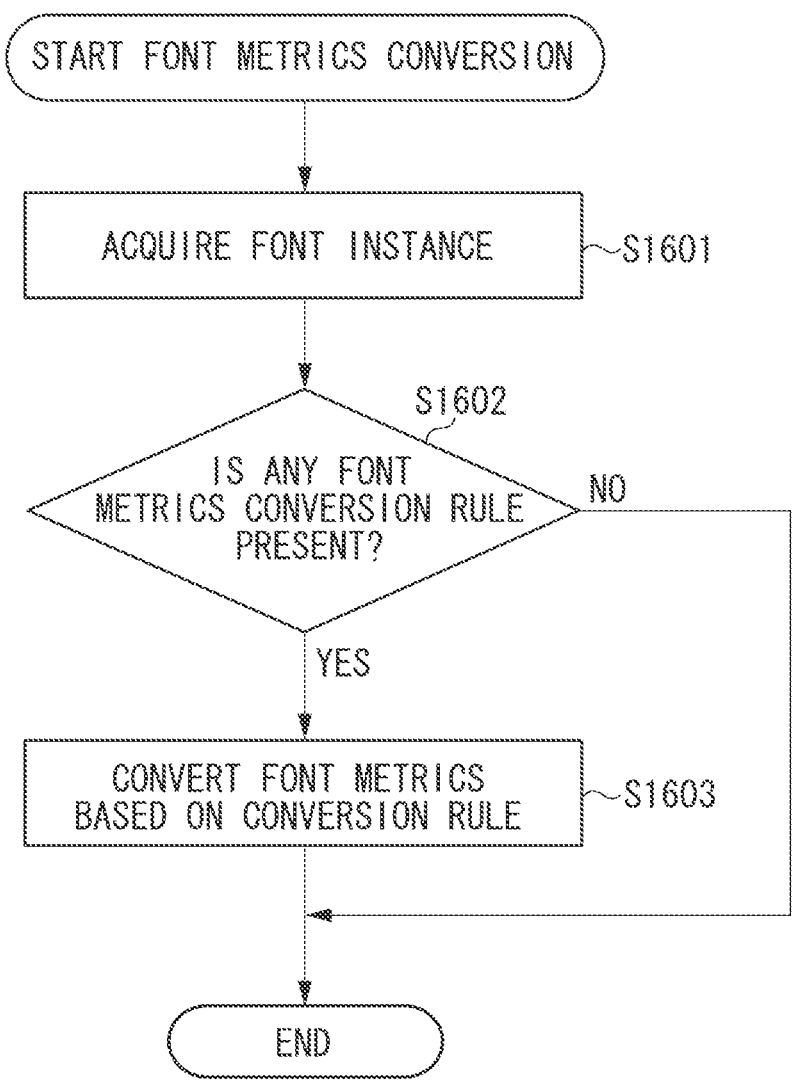
FIG. 16 is a flowchart illustrating processing for converting font metrics according to the sixth exemplary embodiment.

The sixth exemplary embodiment will be described below with respect to a method for converting the font metrics. FIG. 15 illustrates an example of a description in the font setting extension file 306. FIG. 16 is a flowchart illustrating processing for converting the font metrics.

The font metrics include three different values: "ascent" as the quantity from the baseline to the top edge of a character, "descent" as the quantity from the baseline to the bottom edge of a character, and "leading" as the spacing between a plurality of lines. Suitable values of ascent, descent, and leading differ for each font size. Referring to FIG. 15, the font size, ascent value, descent value, and leading value are described in each line. This description forms a font metrics conversion rule.

In step S1601, the font drawing parameter setting unit 304 acquires a font instance and starts processing for converting the font metrics. In step S1602, the font drawing parameter setting unit 304 confirms whether the font setting extension file 306 exists and a font metrics conversion rule corresponding to the size of the acquired font instance is included in the font setting extension file 306.

If such a font metrics conversion rule is present (YES in step S1602), the processing proceeds to step S1603. In step S1603, the font drawing parameter setting unit 304 sets the values of the font metrics of the font instance acquired based on the conversion rule.

On the other hand, if such a font metrics conversion rule is not present (NO in step S1602), the values of the font metrics remain unchanged from the initial values. The initial values are calculated from various data in the font files 301, and depend on the data of the font files 301 and the implementation of the font file reading unit 303.

The above is the method for converting the font metrics.

A seventh exemplary embodiment will be described below. The sixth exemplary embodiment has been described above with respect to a method for converting the font metrics according to the size of a font. However, since there are two different types of fonts, that is, variable-length fonts and fixed-length fonts, whether the font metrics is to be converted depends on the font family.

Figure 17:
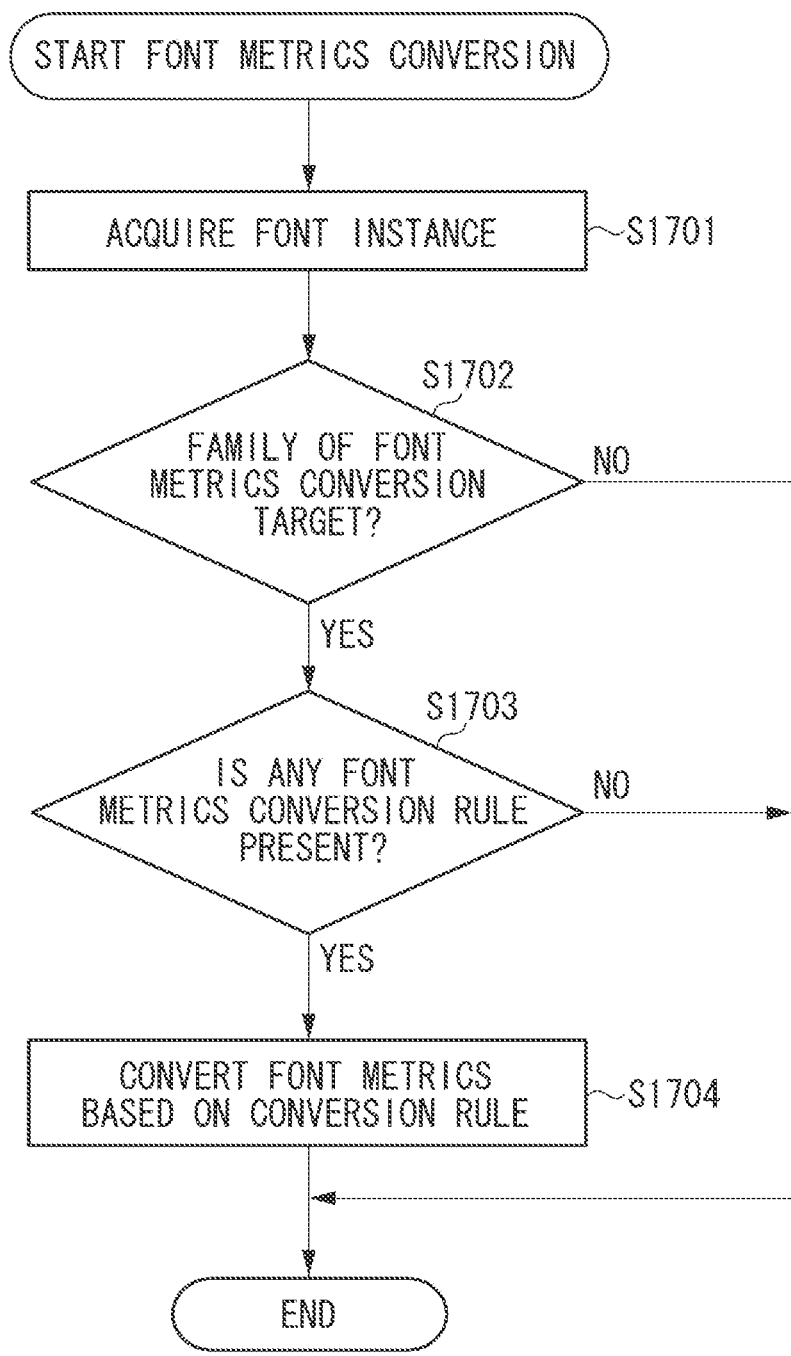
FIG. 17 is a flowchart illustrating processing for converting font metrics according to a seventh exemplary embodiment.

The seventh exemplary embodiment will be described below with respect to a method for selecting whether to convert the font metrics according to the font family. FIG. 17 is a flowchart illustrating processing for converting the font metrics.

In step S1701, the font drawing parameter setting unit 304 acquires a font instance and starts processing for converting the font metrics. In step S1702, the font drawing parameter setting unit 304 determines whether the acquired font family is the family of the font metrics conversion target. To perform this determination, determination processing may be implemented as a code in the processing of the font drawing parameter setting unit 304, or the font family may be added to the font metrics conversion rule of the font setting extension file 306.

When the acquired font family is the family of the font metrics conversion target (YES in step S1702), the processing proceeds to step S1703. In step S1703, the font drawing parameter setting unit 304 performs processing similar to step S1603. In step S1704, the font drawing parameter setting unit 304 performs processing similar to step S1604. On the other hand, when the acquired font family is not a family of the font metrics conversion target (NO in step S1702), the processing for converting the font metrics ends.

The above is the description of the method for converting the font metrics according to the font family.

The seventh exemplary embodiment will be described below. There is a plurality of versions of the virtual machines 202. New versions are provided with an additional function that automatically changes a font with a large font size to a bold font. However, when the virtual machine 202 of a product on which a former version is mounted is upgraded, the font type of non-bold characters before upgrading is changed to a bold font which changes appearance of the characters. Displaying a font in a changed appearance may be inhibited depending on the contract of font acquisition. In this case, a change in appearance may cause an issue.

To address this situation, the virtual machine 202 a mechanism is added for disabling the function of automatically changing characters to a bold font.

Figure 18:
FIG. 18 illustrates an example of a description in the font setting extension file according to an eighth exemplary embodiment.
Figure 19:
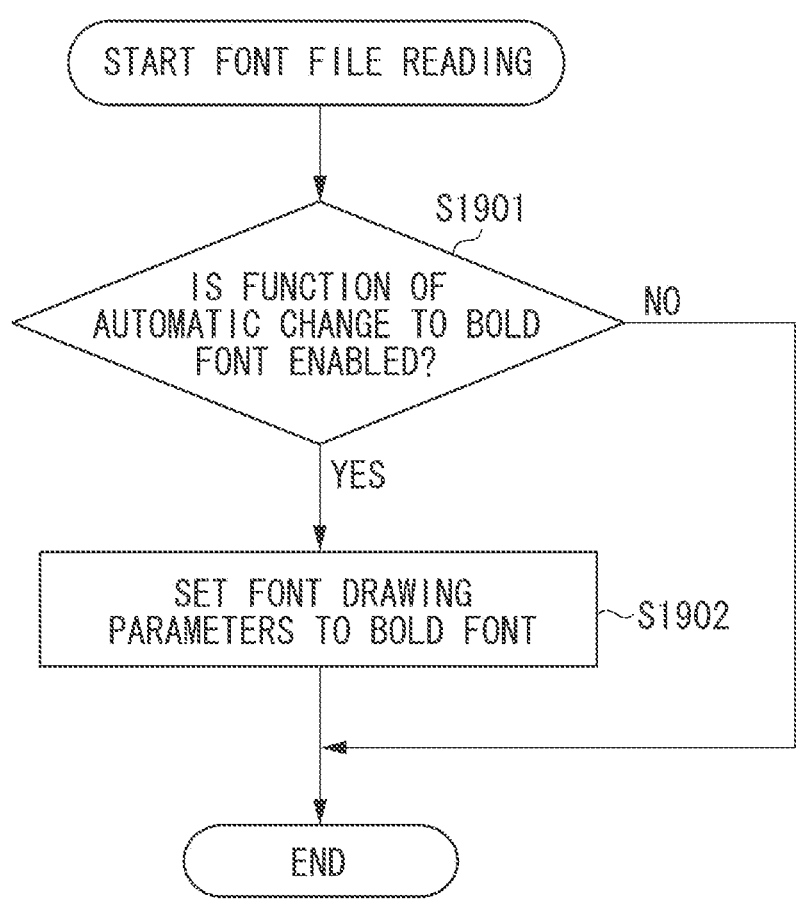
FIG. 19 is a flowchart illustrating processing for drawing a font according to the eighth exemplary embodiment.

An eighth exemplary embodiment will be described below with respect to a method for preventing automatic changing of the drawing target font to a bold font. FIG. 18 illustrates an example of a description in the font setting extension file 306. FIG. 19 is a flowchart illustrating processing for reading a font file.

In the font setting extension file 306 illustrated in FIG. 18, the function of automatically changing characters to a bold font is set to OFF. In step S1901, when reading the font file 301 by using the font file reading unit 303 in step S407, the virtual machine 202 confirms whether the function of automatically changing characters to a bold font is enabled.

When the function is enabled (YES in step S1901), the processing proceeds to step S1902. In step S1902, the virtual machine 202 sets the font drawing parameters to a bold font. On the other hand, when the function is disabled (NO in step S1901), the processing for reading a font file ends.

The above is the method for preventing the drawing target font from unintentionally being changed to a bold font.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-109337, filed May 31, 2016, which is hereby incorporated by reference herein in its entirety.

What is claimed is:

1. An apparatus for executing a plurality of applications on a virtual machine which is operated on an operating system, the apparatus comprising:
at least one processor; and
memory coupled to the at least one processor, the memory having instructions that, when executed by the at least one processor, cause the at least one processor to function as:
an acquisition unit configured to acquire a font size specified by one of the plurality of applications and font setting data including a font size conversion rule including a plurality of font size ranges for classifying a specified font size and a displayed font size which is related with at least one of the plurality of font size ranges, wherein the font size conversion rule included in the font setting data is common for the plurality of applications;
a setting unit configured to set a font size by a function of the virtual machine based on the specified font size and the font setting data; and
a control unit configured to control a display apparatus to display a font with the font size set by the setting unit.

2. The apparatus according to claim 1, wherein the control unit controls the display apparatus to display a font by using font data including a scalable font and a bitmap font.

3. The apparatus according to claim 1, wherein the control unit differentiates font display for each font family.

4. The apparatus according to claim 1, wherein the control unit differentiates font display for each language set in the apparatus.

5. The apparatus according to claim 1,
wherein a font style conversion rule is included in the font setting data, and
wherein the control unit controls the display apparatus to display a font with a font style based on the font setting data.

6. The apparatus according to claim 2, wherein the control unit controls the display apparatus to display a font giving priority to the bitmap font over the scalable font.

7. The apparatus according to claim 1,
wherein the font setting data includes font metrics for each font size, and
wherein the control unit controls the display apparatus to display a font with the font metrics based on the font setting data.

8. The apparatus according to claim 1, wherein the control unit sets font metrics for each font family and controls the display apparatus to display a font.

9. The apparatus according to claim 1, further comprising a disabling unit configured to disable a function of automatically changing a font type in the virtual machine to a bold font.

10. A method of an apparatus for executing a plurality of applications on a virtual machine which is operated on an operating system, the method comprising:
acquiring a font size specified by one of the plurality of applications and font setting data including a font size conversion rule including a plurality of font size ranges for classifying a specified font size and a displayed font size which is related with at least one of the plurality of font size ranges, wherein the font size conversion rule included in the font setting data is common for the plurality of applications;
setting a font size by a function of the virtual machine based on the specified font size and the font setting data; and
controlling a display apparatus to display a font with the set font size.

11. The method according to claim 10, wherein the controlling controls the display apparatus to display a font by using font data including a scalable font and a bitmap font.

12. The method according to claim 10,
wherein a font style conversion rule is included in the font setting data, and
wherein the controlling controls the display apparatus to display a font with a font style based on the font setting data.

13. The method according to claim 10,
wherein the font setting data includes font metrics for each font size, and
wherein the controlling controls the display apparatus to display a font with the font metrics based on the font setting data.

14. The method according to claim 10, wherein the controlling sets font metrics for each font family and controls the display apparatus to display a font.

15. The method according to claim 10, further comprising disabling a function of automatically changing a font type in the virtual machine to a bold font.

16. A non-transitory storage medium storing a program causing a computer to execute a method for executing a plurality of applications on a virtual machine which is operated on an operating system, the method comprising:
- acquiring a font size specified by one of the applications and font setting data including a font size conversion rule including a plurality of font size ranges for classifying a specified font size and a displayed font size which is related with at least one of the plurality of font size ranges, wherein the font size conversion rule included in the font setting data is common for the plurality of applications;
- setting a font size by a function of the virtual machine based on the specified font size and the font setting data; and
- controlling a display apparatus to display a font with the set font size.

17. The non-transitory storage medium according to claim 16,
- wherein a font style conversion rule is included in the font setting data, and
- wherein the controlling controls the display apparatus to display a font with a font style based on the font setting data.

18. The non-transitory storage medium according to claim 16,
- wherein the font setting data includes font metrics for each font size, and
- wherein the controlling controls the display apparatus to display a font with the font metrics based on the font setting data.

19. The non-transitory storage medium according to claim 16, wherein the controlling sets font metrics for each font family and controls the display apparatus to display a font.

20. The non-transitory storage medium according to claim 16, further comprising disabling a function of automatically changing a font type in the virtual machine to a bold font.

* * * * *